(12) United States Patent
Ota

(10) Patent No.: US 7,853,051 B2
(45) Date of Patent: Dec. 14, 2010

(54) RECOGNIZING APPARATUS AND METHOD, RECORDING MEDIA, AND PROGRAM

(75) Inventor: Shunji Ota, Kasugai (JP)

(73) Assignee: OMRON Corporation, Kyoto (JP)

( * ) Notice: Subject to any disclaimer, the term of this patent is extended or adjusted under 35 U.S.C. 154(b) by 1071 days.

(21) Appl. No.: 11/527,879

(22) Filed: Sep. 27, 2006

(65) Prior Publication Data

US 2007/0071321 A1    Mar. 29, 2007

(30) Foreign Application Priority Data

Sep. 28, 2005    (JP) .............................. 2005-281228

(51) Int. Cl.
*G06K 9/00*    (2006.01)
(52) U.S. Cl. ..................... 382/118; 382/103; 382/107
(58) Field of Classification Search ................. 382/103, 382/107, 118; 345/863
See application file for complete search history.

(56) References Cited

U.S. PATENT DOCUMENTS

| 5,912,721 | A | 6/1999 | Yamaguchi et al. |
| 6,677,969 | B1 | 1/2004 | Hongo |
| 7,194,347 | B2 * | 3/2007 | Harumoto et al. ............. 701/45 |
| 2005/0179785 | A1 * | 8/2005 | Shingu et al. ............ 348/211.3 |

FOREIGN PATENT DOCUMENTS

| JP | 09-251342 A | 9/1997 |
| JP | 10-105310 A | 4/1998 |
| JP | 2000-163196 | 6/2000 |

OTHER PUBLICATIONS

Extended European Search Report for European Application No. 06121275 mailed on Jan. 1, 2007 (7 pages).
Kapor, A., et al; "A Real-Time Head Nod and Shake Detector" Proceedings of the 2001 Workshop on Perceptive User Interfaces, Nov. 2001, pp. 1-5.
Heinzmann, J. et al; "3-D Facial Pose and Gaze Point Estimation Using a Robust Real-Time Tracking Paradigm" Automatic Face and Gesture Recognition, 1998. Proceedings. Third IEEE International Conference on Nara, Japan Apr. 14-16, 1998, Los Alamitos, CA USA, IEEE Comput. Soc, US, Apr. 14, 1998, pp. 142-147.
Patent Abstracts of Japan; Publication No. 2000-163196; Date of publication: Jun. 16, 2000 (1 page).
Office Action for Japanese Application No. 2005-281228 mailed on Sep. 21, 2010 and English translation thereof, 6 pages.

* cited by examiner

*Primary Examiner*—Tom Y Lu
(74) *Attorney, Agent, or Firm*—Osha Liang LLP

(57) ABSTRACT

The present invention enables a user's movement indicating his or her intention to be recognized easily and accurately. On the basis of image data taken by a camera 13, a face direction detecting section 14 senses the direction of a user's face and a line-of-sight sensing section 15 senses the direction of the user's line of sight. When the user's face is directed downward, while the user's line of sight is directed upward with respect to the face direction, a nod recognizing section 21 recognizes that the user has nodded. When the user's face is directed rightward or leftward, while the user's line of sight is directed in a direction laterally opposite to the face direction, a head shake recognizing section 22 recognizes that the user has shaken his or her head. The present invention is applicable to an intention checking apparatus that checks the driver's intention.

12 Claims, 17 Drawing Sheets

FIG. 21

UPWARD FACE DIRECTION

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 2 | 1 | 1 | 1 |
| 0 | 0 | 0 | 0 | 0 | 0 | 1 | 4 | 4 | 3 |
| 0 | 0 | 0 | 0 | 0 | 0 | 1 | 4 | 5 | 4 |
| 0 | 0 | 0 | 0 | 0 | 0 | 1 | 3 | 4 | 5 |

DOWNWARD LINE-OF-SIGHT DIRECTION ← → UPWARD LINE-OF-SIGHT DIRECTION

DOWNWARD FACE DIRECTION

FIG. 22

RIGHTWARD FACE DIRECTION

| 5 | 4 | 3 | 1 | 0 | 0 | 0 | 0 | 0 | 0 |
|---|---|---|---|---|---|---|---|---|---|
| 4 | 5 | 4 | 1 | 0 | 0 | 0 | 0 | 0 | 0 |
| 3 | 4 | 4 | 1 | 0 | 0 | 0 | 0 | 0 | 0 |
| 1 | 1 | 1 | 2 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 2 | 1 | 1 | 1 |
| 0 | 0 | 0 | 0 | 0 | 0 | 1 | 4 | 4 | 3 |
| 0 | 0 | 0 | 0 | 0 | 0 | 1 | 4 | 5 | 4 |
| 0 | 0 | 0 | 0 | 0 | 0 | 1 | 3 | 4 | 5 |

LEFTWARD LINE-OF-SIGHT DIRECTION ← → RIGHTWARD LINE-OF-SIGHT DIRECTION

LEFTWARD FACE DIRECTION

RECOGNIZING APPARATUS AND METHOD, RECORDING MEDIA, AND PROGRAM

BACKGROUND OF THE INVENTION

1. Field of the Invention

The present invention relates to a recognizing apparatus, method, and recording medium, and in particular, to a recognizing apparatus, method, and recording medium, for enabling easy and accurate recognition of movement indicating a user's intention.

2. Description of the Related Art

It has been proposed that if an apparatus is waiting for a user's instruction, then upon detecting that the user is nodding while gazing any of multiple selection candidates displayed on a display section, the apparatus determines that the item gazed by the user has been selected and thus executes a predetermined process (see, for example, Japanese Patent Laid-Open No. 2000-163196).

However, the invention described in Japanese Patent Laid-Open No. 2000-163196 cannot detect the user's intention if the user cannot gaze a single point on the display section because, for example, he or she is driving the car.

The present invention is made in view of these circumstances. An object of the present invention is to enable the user's movement indicating his or her intention to be recognized easily and accurately.

SUMMARY OF THE INVENTION

A recognizing apparatus in accordance with an aspect of the present invention comprises face direction sensing means for sensing a direction of a user's face, line-of-sight direction sensing means for sensing a direction of the user's line of sight, and movement recognizing means for recognizing the user's movement indicating the user's intention on the basis of a difference between the direction of the face and the direction of the line of sight.

The recognizing apparatus in accordance with the aspect of the present invention senses the direction of the user's face, senses the direction of the user's line of sight, and recognizes the user's movement indicating the user's intention on the basis of the difference between the direction of the face and the direction of the line of sight.

The user's movement indicating his or her intention can thus be recognized easily and accurately. The user's intention can therefore be recognized easily and reliably.

The face direction sensing means, line-of-sight direction sensing means, and movement recognizing means are composed of, for example, a CPU. The face direction sensing means maybe composed of, for example, a dedicated device that senses the face direction. The line-of-sight direction sensing means may be composed of, for example, a dedicated device that senses the line-of-sight direction.

The movement recognizing means can recognize that the user has nodded to indicate the user's intention if the user is in a state in which the user's face is directed downward, while the user's line of sight is directed upward with respect to the direction of the face.

This enables the user's nodding to be recognized easily and accurately.

The movement recognizing means can recognize that the user has nodded to indicate the user's intention if, within a predetermined time after the user is urged to indicate the user's intention, the user makes a first change in which the user moves from a second to a first state or a second change in which the user moves from the first state to the second state.

This enables the user's nodding to be recognized more accurately.

The movement recognizing means can recognize that the user has nodded to indicate the user's intention if, within the predetermined time, the user makes the first change at least a predetermined first number of times and makes the second change at least a predetermined second number of times.

This enables the user's nodding to be recognized more accurately.

The movement recognizing means can recognize that that the user has nodded to indicate the user's intention if the user is in a first state in which, within the predetermined time, the face is tilted downward at least a predetermined first angle from a predetermined direction, the line of sight is tilted upward at least a predetermined second angle with respect to the direction of the face, a sum of an angle of the face tilted-downward from the predetermined direction and an angle of the line of sight tilted upward with respect to the direction of the face becomes at least a predetermined threshold, and a leftward or rightward direction of the face is less than a predetermined third angle from the predetermined direction.

This enables the user's nodding to be recognized more accurately.

The movement recognizing means can recognize that the user has shaken the user's head to indicate the user's intention if the user is in a first state in which the user's face is directed rightward while the user's line of sight is directed leftward with respect to the direction of the face or if the user is in a second state in which the user's face is directed leftward while the user's line of sight is directed rightward with respect to the direction of the face.

This enables the user's head shaking to be recognized easily and accurately.

The movement recognizing means can recognize that the user has shaken the user's head to indicate the user's intention if, within a predetermined time after the user is urged to indicate the user's intention, the user makes a first change in which the user moves from a third state to the first state, a second change in which the user moves from the third state to the second state, a third change in which the user moves from the first state to the third state, or a fourth change in which the user moves from the second state to the third state.

This enables the user's head shaking to be recognized more accurately.

The movement recognizing means can recognize that the user has shaken the user's head to indicate the user's intention if, within the predetermined time, the user makes the first change at least a predetermined first number of times and makes the second change at least a predetermined second number of times.

This enables the user's head shaking to be recognized more accurately.

The movement recognizing means can recognize that the user has shaken the user's head to indicate the user's intention if: the user is in a third state in which, within the predetermined time, the face is turned rightward at least a predetermined first angle from a predetermined direction, the line of sight is turned leftward to at least a predetermined second angle with respect to the direction of the face, a sum of an angle of the face turned rightward from the predetermined direction and an angle of the line of sight turned leftward with respect to the direction of the face becomes at least a predetermined threshold, and an upward or downward direction of the face is less than a predetermined third angle from the predetermined direction, or if the user is in a fourth state in which, within the predetermined time, the face is turned leftward to at least the first angle from the predetermined direction, the line of sight is turned rightward to at least the second angle with respect to the direction of the face, a sum of an angle of the face turned leftward from the predetermined direction and an angle of the line of sight turned rightward with respect to the direction of the face becomes at least the predetermined threshold, and the upward or downward direction of the face is less than the predetermined third angle from the predetermined direction.

This enables the user's head shaking to be recognized more accurately.

The recognizing apparatus can further comprise intention recognizing means for recognizing the user's intention on the basis of the user's movement indicating the user's intention recognized by the movement recognizing means.

This enables the user's intention to be recognized easily and accurately.

The intention recognizing means is composed of, for example, a CPU.

A recognizing method in accordance with an aspect of the present invention comprises sensing a direction of a user's face, sensing a direction of the user's line of sight, and recognizing the user's movement indicating the user's intention on the basis of a difference between the direction of the face and the direction of the line of sight.

According to the recognizing method in accordance with the aspect of the present invention, the direction of the user's face is sensed, the direction of the user's line of sight is sensed, and the user's movement indicating the user's intention is recognized on the basis of the difference between the direction of the face and the direction of the line of sight.

The user's movement indicating his or her intention can thus be recognized easily and accurately. The user's intention can therefore be recognized easily and reliably.

The face direction sensing step involves sensing the direction of the user's face via the CPU on the basis of data on an image of the user's face. The line-of-sight direction sensing step involves sensing the direction of the user's line of sight via the CPU on the basis of data on the image of the user's face. The movement recognizing step involves, for example, recognizing the user's movement indicating the user's intention via the CPU.

As described above, the aspect of the present invention enables the user's movement indicating his or her intention to be recognized easily and accurately. This enables the user's intention to be recognized easily and reliably.

BRIEF DESCRIPTION OF THE DRAWINGS

FIG. 21 is a diagram illustrating still another method of recognizing the driver's nodding;

FIG. 22 is a diagram illustrating still another method of recognizing the driver's head shaking.

DESCRIPTION OF SYMBOLS

Figure 1:
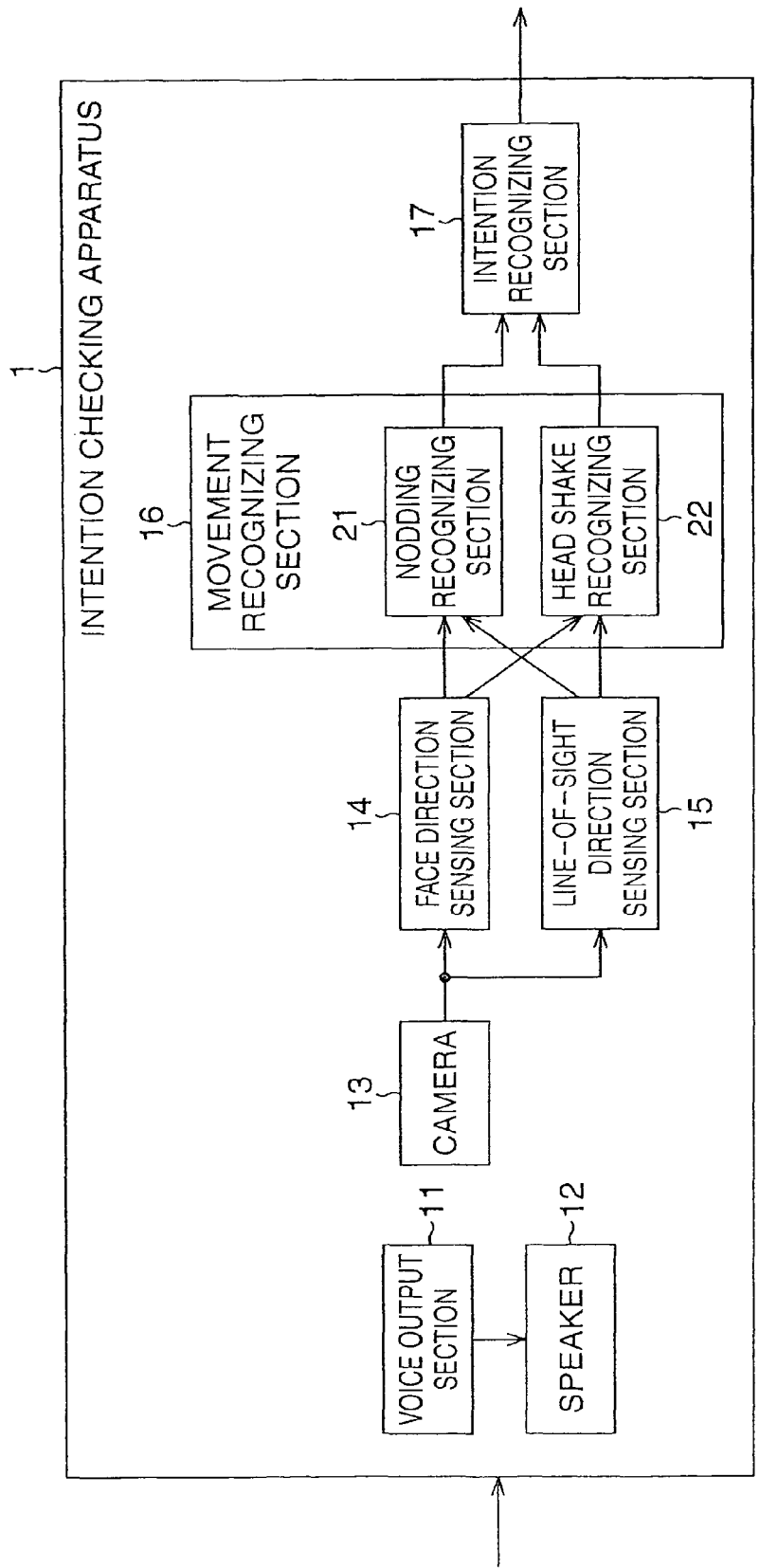
FIG. 1 is a block diagram showing an embodiment of an intention checking apparatus to which the present invention is applied.

1 Intention checking apparatus
11 Voice output section
13 Camera
14 Face direction sensing section (face direction sensing means)
15 Line-of-sight direction sensing section (line-of-sight direction sensing means)
16 Movement recognizing section (movement recognizing means)
17 Intention recognizing section (intention recognizing means)
21 Nod recognizing section
22 Head shake recognizing section
901 CPU
902 ROM
903 RAM
908 Recording section
910 Drive
911 Removable media

DETAILED DESCRIPTION OF THE PREFERRED EMBODIMENTS

Embodiments of the present invention will be described below with reference to the drawings.

FIG. 1 is a block diagram showing an embodiment of an intention checking apparatus to which the present invention is applied. The intention checking apparatus 1 includes a voice output section 11, a speaker 12, a camera 13, a face direction sensing section 14, a line-of-sight direction sensing section 15, a movement recognizing section 16, and an intention recognizing section 17. The movement recognizing section 16 includes a nod recognizing section 21 and a head shake recognizing section 22.

Description will be given below mainly taking the case where the intention checking apparatus 1 is installed inside a car to check a driver of the car for his or her intention. However, the place in which the intention checking apparatus 1 is installed is not limited to the inside of the car. The target the intention of which is checked by the intention checking apparatus 1 is not limited to the driver of the car.

If an external application apparatus (not shown; for example, a driving support apparatus, navigation apparatus, car air conditioner, or car stereo) inputs information requesting the check of the driver's intention, to the intention checking apparatus 1, the voice output section 11 generates voice data urging the driver to indicate his or her intention. The voice output section 11 outputs a voice through the speaker 12 based on the voice data. For example, to urge the driver to indicate his or her intention, the voice output section 11 outputs a voice message such as "Settings will be automatically changed. OK?" through the speaker 12.

The camera 13 uses, for example, a CCD (Charge Coupled Device) image pickup element, a CMOS (Complementary Metal Oxide Semiconductor) image pickup element, a logarithmic transformation image pickup element (for example, HDRC (High Dynamic Range CMOS (Complementary Metal Oxide Semiconductor)) (registered trade mark)), or the like. The camera 13 exhibits performance (for example, resolution: 640 (per row)×480 (per column) pixels; the number of gray scales: 256; frame rate: 30 frames per sec) required to sense the directions of the driver's face and line of sight. The camera 13 is installed at a position where it can pick up an image of the driver's face. The camera 13 supplies image data including the driver's face obtained by image pickup, to the face direction sensing section 14 and the line-of-sight direction sensing section 15.

The face direction sensing section 14 senses the direction of the driver's face on the basis of the image data supplied by the camera 13. The technique for sensing of the face direction by the face direction sensing section 14 is not limited to any particular technique. A technique is desirably used which can sense the face direction both more quickly and accurately. The face direction sensing section 14 supplies information indicating the sensed direction of the driver's face, to a nod recognizing section 21 and a head shake recognizing section 22.

For example, the face direction sensing section 14 senses the face direction based on the state in which the driver looks in a reference direction (for example, a horizontal direction with respect to front of the car and the ground), at an angular resolution of 5° every 0.2 seconds in both vertical and lateral directions. In the description below, for the face direction, the vertical direction is indicated by a positive value, while the downward direction is indicated by a negative value, on the basis of the state in which the driver looks in the reference direction. The lateral direction is indicated by a positive value, while the leftward direction is indicated by a negative value. For example, if the driver tilts his or her head by 10° upward from the state in which the driver looks in the reference direction, the vertical face direction is 10°. If the driver tilts his or her head by 10° downward, the vertical face direction is −10°. If the driver tilts his or her head by 10° rightward, the lateral face direction is 10°. If the driver tilts his or her head by 10° leftward, the lateral face direction is −10°.

The line-of-sight direction sensing section 15 senses the direction of the driver's line of sight with respect to the direction of the driver's face on the basis of the image data supplied by the camera 13. The technique for sensing of the line-of-sight direction by the line-of-sight direction sensing section 15 is not limited to any particular technique. A technique is desirably used which can sense the line-of-sight direction both more quickly and accurately. The line-of-sight direction sensing section 15 supplies information indicating the sensed direction of the driver's line of sight, to the nod recognizing section 21 and the head shake recognizing section 22.

For example, the line-of-sight direction sensing section 15 senses the driver's line-of-sight direction with respect to the driver's face direction at an angular resolution of 5° every 0.2 seconds in both vertical and lateral directions of the face. In the description below, for the line-of-sight direction, among the vertical directions, the upward direction is indicated by a positive value, while the downward direction is indicated by a negative value, on the basis of the face direction. Among the lateral direction, the rightward direction is indicated by a positive value, while the leftward direction is indicated by a negative value. For example, if the driver moves his or her line of sight by 10° upward on the basis of the direction of the driver's face, the line-of-sight direction in the vertical face direction is 10°. If the driver moves his or her line of sight by 10° downward, the line-of-sight direction in the vertical face direction is −10°. If the driver moves his or her line of sight by 10° rightward, the line-of-sight direction in the lateral face direction is 10°. If the driver moves his or her line of sight by 10° leftward, the line-of-sight direction in the lateral face direction is −10°.

The following are not limited to the above example: the time intervals and angular resolution used to sense the face or line-of-sight direction as well as the coordinate system indicating the face or line-of-sight direction.

The movement recognizing section 16 recognizes the driver's movement indicating his or her intention on the basis of the difference between the driver's face direction and line-of-sight direction.

The nod recognizing section 21 recognizes whether or not the driver has nodded to indicate his or her intention on the basis of the difference between the driver's face direction and line-of-sight direction, as described later with reference to FIG. 3. The nod recognizing section 21 supplies information indicative of the recognition result to the intention recognizing section 17.

The head shake recognizing section 22 recognizes whether or not the driver has shaken his or her head to indicate his or her intention on the basis of the difference between the driver's face direction and line-of-sight direction. The head shake recognizing section 22 supplies information indicative of the recognition result to the intention recognizing section 17.

The intention recognizing section 17 recognizes the driver's intention on the basis of the recognition result supplied by the nod recognizing section 21 or the head shake recognizing section 22. The intention recognizing section 17 outputs information indicative of the recognition result to the application apparatus requesting the check of the driver's intention.

Now, processing executed by the intention checking apparatus 1 will be described with reference to FIGS. 2 to 16.

Figure 2:
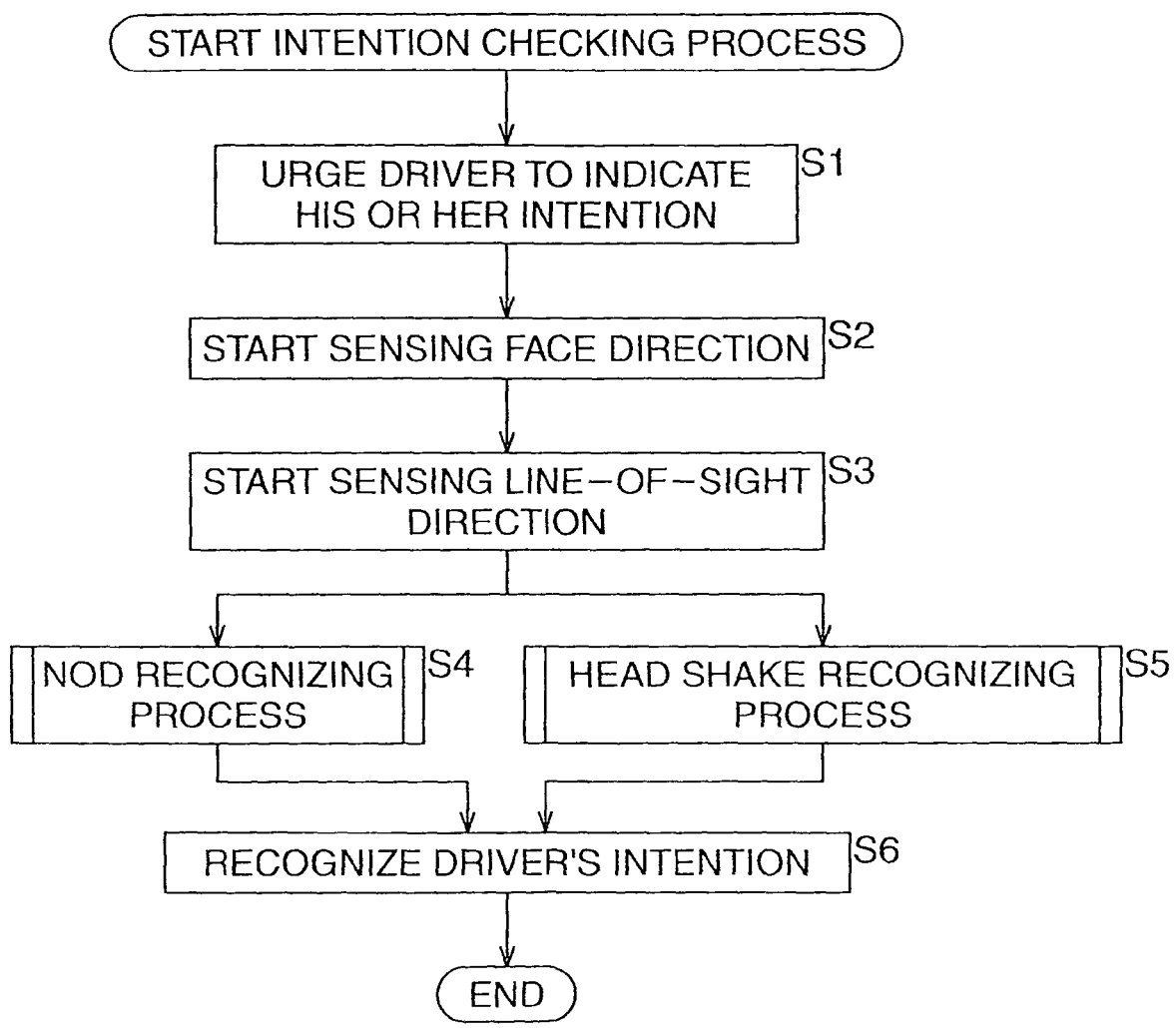
FIG. 2 is a flowchart illustrating an intention checking process of the intention checking apparatus in FIG. 1.

First, an intention checking process executed by the intention checking apparatus 1 will be described with reference to the flowchart in FIG. 2. This process is started when, for example, an external application apparatus (not shown) inputs information requesting the check of the driver's intention, to the intention checking apparatus 1.

In step S1, the voice output section 11 urges the driver to indicate his or her intention. Specifically, the voice output section 11 generates voice data urging the driver to indicate his or her intention. The voice output section 11 then causes the speaker 12 to output a voice based on the voice data.

In step S2, the face direction sensing section 14 starts sensing the face direction on the basis of the image data supplied by the camera 13. The face direction sensing section 14 starts supplying the information indicative of the sensed direction of the driver's face to the nod recognizing section 21 and the head shake recognizing section 22.

In step S3, the line-of-sight direction sensing section 15 starts sensing the line-of-sight direction on the basis of the image data supplied by the camera 13. The line-of-sight direction sensing section 15 starts supplying the information indicative of the sensed direction of the driver's face to the nod recognizing section 21 and the head shake recognizing section 22.

In step S4, the nod recognizing section 21 executes a nod recognizing process. The nod recognizing process will be described later in detail with reference to FIG. 3. This process recognizes whether or not the driver has nodded in response to a message urging the driver to indicate his or her intention. The nod recognizing section 21 supplies information indicating the recognition result to the intention recognizing section 17.

In step S5, the head shake recognizing section 22 executes a head shake recognizing process. The head shake recognizing process will be described later in detail with reference to FIG. 10. This process recognizes whether or not the driver has shaken his or her head in response to a message urging the driver to indicate his or her intention. The head shake recognizing section 22 supplies information indicating the recognition result to the intention recognizing section 17.

Steps S4 and S5 are executed in parallel.

In step S6, the intention recognizing section 17 recognizes the driver's intention on the basis of the recognition result of the nod recognizing section 21 or the head shake recognizing section 22 to finish the intention checking process. Specifically, if the nod recognizing section 21 recognizes that the driver has nodded, while the head shake recognizing section 22 recognizes that the driver has not shaken his or her head, then the intention recognizing section 17 recognizes that the driver has indicated affirmation by the driver. If the nodding recognizing section 21 recognizes that the driver has not nodded, while the head shake recognizing section 22 recognizes that the driver has shaken his or her head, the intention recognizing section 17 recognizes that the driver has indicated negation. If the nodding recognizing section 21 recognizes that the driver has not nodded and the head shake recognizing section 22 recognizes that the driver has not shaken his or her head, the intention recognizing section 17 recognizes that the driver has not indicated his or her intention.

If the nodding recognizing section 21 recognizes that the driver has nodded and the head shake recognizing section 22 recognizes that the driver has shaken his or her head, the intention recognizing section 17 recognizes the driver's intention, for example, on the basis of his or her movement recognized earlier or later. Alternatively, the driver's intention may be recognized on the basis of the likelihood of nodding on the basis of which whether or not the driver has nodded is determined and the likelihood of head shaking on the basis of which whether or not the driver has shaken his or her head is determined. The likelihood of nodding and the likelihood of head shaking will be described later.

The intention recognizing section 17 outputs information indicative of the recognition result to the application apparatus having requested the check of the driver's intention. The application apparatus executes a process based on the recognized intention of the driver.

The nodding motion or head shaking motion may vary depending on countries or culture. For example, settings in the intention checking apparatuses 1 are pre-changed so as to be able to accurately recognize the driver's intention depending on the variations.

Now, the nod recognizing process in step S4 in FIG. 2 will be described in detail with reference to the flowchart in FIG. 3.

In step S21, the nod recognizing section 21 sets a reference direction. Specifically, the reference direction set by the nod recognizing section 21 is, for example, the face direction observed when the sensing of the face direction is started in step S2 or the direction in which the driver looks most frequently during driving.

In step S22, the nod recognizing section 21 starts calculating the likelihood of nodding. Now, with reference to FIGS. 4 to 7, description will be given of a method of calculating the likelihood of nodding.

Figure 4:
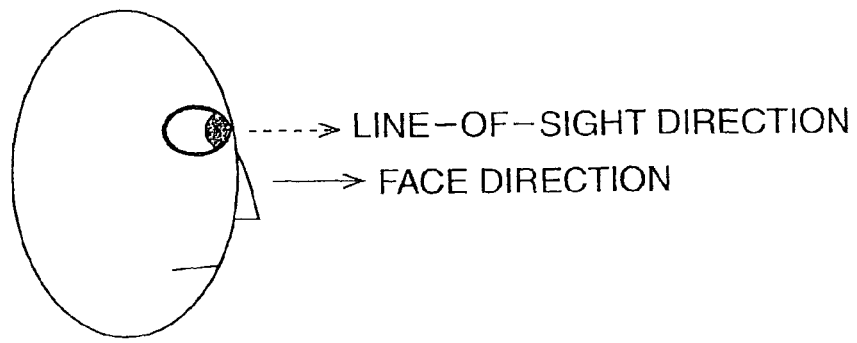
FIG. 4 is a diagram schematically showing the directions of face and line of sight of a person looking straight ahead.
Figure 5:
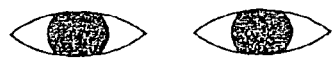
FIG. 5 is a diagram schematically showing the condition of eyes of the person shown in FIG. 4.

FIG. 4 schematically shows the directions of face and line of sight of a person looking almost straight ahead as viewed from the side of his or her head. FIG. 5 schematically shows the condition of eyes of the person shown in FIG. 4. As shown in FIG. 4, if the person is looking almost straight ahead, for example, if the driver is looking forward while driving a car, the face direction almost coincides with the line-of-sight direction. In spite of the difference among individuals, the iris is located almost in the center of each eye as shown in FIG. 5.

Figure 6:
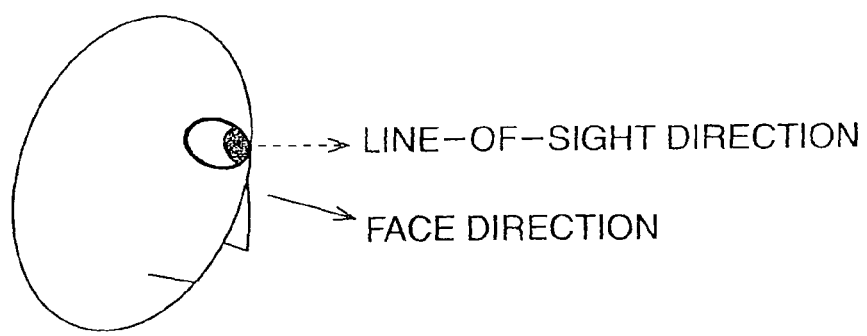
FIG. 6 is a diagram schematically showing the directions of face and line of sight of a nodding person.
Figure 7:
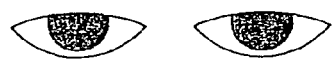
FIG. 7 is a diagram schematically showing the condition of eyes of the person shown in FIG. 6.

FIG. 6 schematically shows the directions of face and line of sight of a person nodding to indicate his or her intention as viewed from the side of his or her head. FIG. 7 schematically shows the condition of eyes of the person shown in FIG. 6. When a person nods to indicate his or her intention, he or she tends to change only the face direction while almost fixing his or her eyes. For example, while two persons are taking a conversation, each of them nods while almost focusing his or her eyes on the other. While performing an operation such as driving, a person nods while almost focusing his or her eyes on the target of the operation. Even if the person has no such a target to gaze, he or she need not look in the direction of the nodding and thus nods while almost fixing his or her eyes.

Accordingly, when a person nods, the face direction deviates from the line-of-sight direction as shown in FIG. 6. That is, the face moves downward, while the eyes move upward with respect to the face direction. Thus, in spite of the difference among individuals, the iris moves upward in each eye, that is, in the direction opposite to that of movement of the face as shown in FIG. 7. In other words, the person casts an upward glance.

The nod recognizing section 21 calculates the likelihood of nodding by noting the difference between the movements (directions) of the face and the line of sight in the vertical direction observed when a person nods. Specifically, the likelihood of nodding is calculated in accordance with Equation (1) shown below if the driver's face is located at least a predetermined first angle (for example, 5°) downward from a reference direction and if the driver's line of sight is located at least a predetermined second angle (for example, 5°) upward from the face direction and if the leftward or rightward face direction is located at less than a predetermined third angle (for example, 5°) from a reference direction, that is, if the driver looks downward and almost in the lateral reference direction, while casting an upward glance.

Likelihood of nodding=vertical line-of-sight direction with respect to the face direction−vertical face direction    (1)

That is, the likelihood of nodding is expressed by the sum of the angle between the face direction and the line-of-sight direction observed when the person casts an upward glance and the angle between the face direction and the line-of-sight direction observed when the person casts a downward glance (Equation (1) is a subtraction because of the signs of the angles).

On the other hand, if the face and line-of-sight directions are not in the above conditions, the likelihood of nodding is zero.

The nod recognizing section 21 starts calculating the likelihood of nodding on the basis of the, above method.

In step S23, the nod recognizing section 21 determines whether or not a predetermined time has elapsed since the driver was urged to indicate his or her intention. If the nod recognizing section 21 determines that the predetermined time (for example, 7 seconds) has not elapsed since the urging of the message to indicate the driver's intention in step S1, the process proceeds to step S24.

In step S24, the nod recognizing section 21 determines whether or not the likelihood of nodding is at least a predetermined threshold. If the nod recognizing section 21 determines that the likelihood of nodding is less than the predetermined threshold (for example, 30), the process returns to step S23.

The processing in steps S23 and S24 is subsequently repeated until the nod recognizing section 21 determines in step S23 that the predetermined time has elapsed since the driver was urged to indicate his or her intention or until the nod recognizing section 21 determines in step S24 that the likelihood of nodding is at least the predetermined threshold.

If the nod recognizing section 21 determines in step S24 that the likelihood of nodding is at least the threshold, the process proceeds to step S25.

Figure 8:
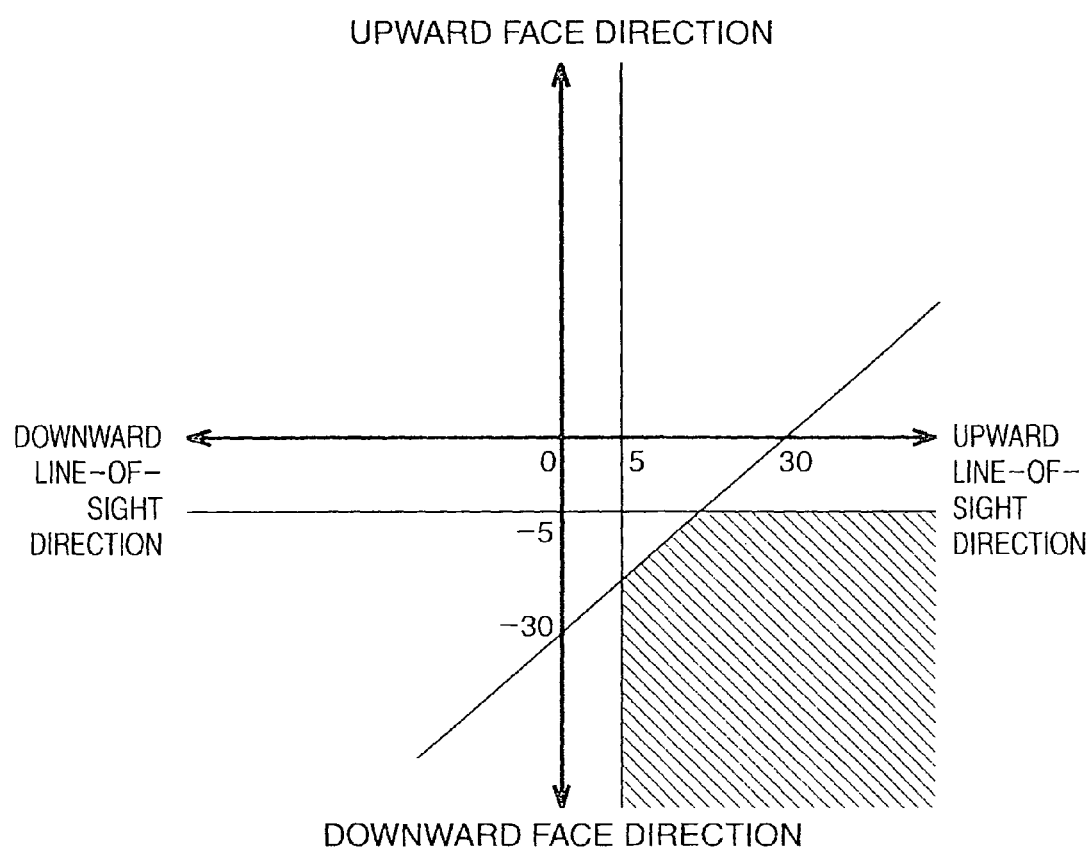
FIG. 8 is a graph showing the state in which the likelihood of nodding is at least a threshold.

FIG. 8 is a graph in which the axis of abscissa indicates the vertical line-of-sight direction with respect to the face direction, whereas the axis of ordinate indicates the vertical face direction with respect to the reference direction. The angle of the upward line-of-sight direction increases as a point on the axis of abscissa moves rightward from the origin. The angle of the downward line-of-sight direction increases as the point on the axis of abscissa moves leftward from the origin. The angle of the upward face direction increases as a point on the axis of ordinate moves upward from the origin. The angle of the downward face direction increases as the point on the axis of ordinate moves downward from the origin.

In a shaded area in FIG. 8, the likelihood of nodding is at least a predetermined threshold (in the example shown in FIG. 8, 30). That is, in the shaded area, the driver's face is located at least the predetermined first angle (in the example shown in FIG. 8, 5°) downward from the reference direction, the driver's line of sight is located at least the predetermined second angle (in the example shown in FIG. 8, 5°) upward from the face direction, and the sum (likelihood of nodding) of the angle between the downward face direction and the reference direction and the angle between the upward line-of-sight direction and the face direction is at least the predetermined threshold (in the example shown in FIG. 8, 30).

In step S25, the nod recognizing section 21 recognizes that the driver has nodded, to finish the nod recognizing process. The nod recognizing section 21 then supplies information indicative of the recognition result to the intention recognizing section 17.

If the nod recognizing section 21 determines in step S23 that the predetermined time has elapsed since the driver was urged to indicate his or her intention, the process proceeds to step S26.

In step S26, the nod recognizing section 21 recognizes that the driver has not nodded, to finish the nod recognizing process. The nod recognizing section 21 then supplies information indicative of the recognition result to the intention recognizing section 17.

Figure 9:
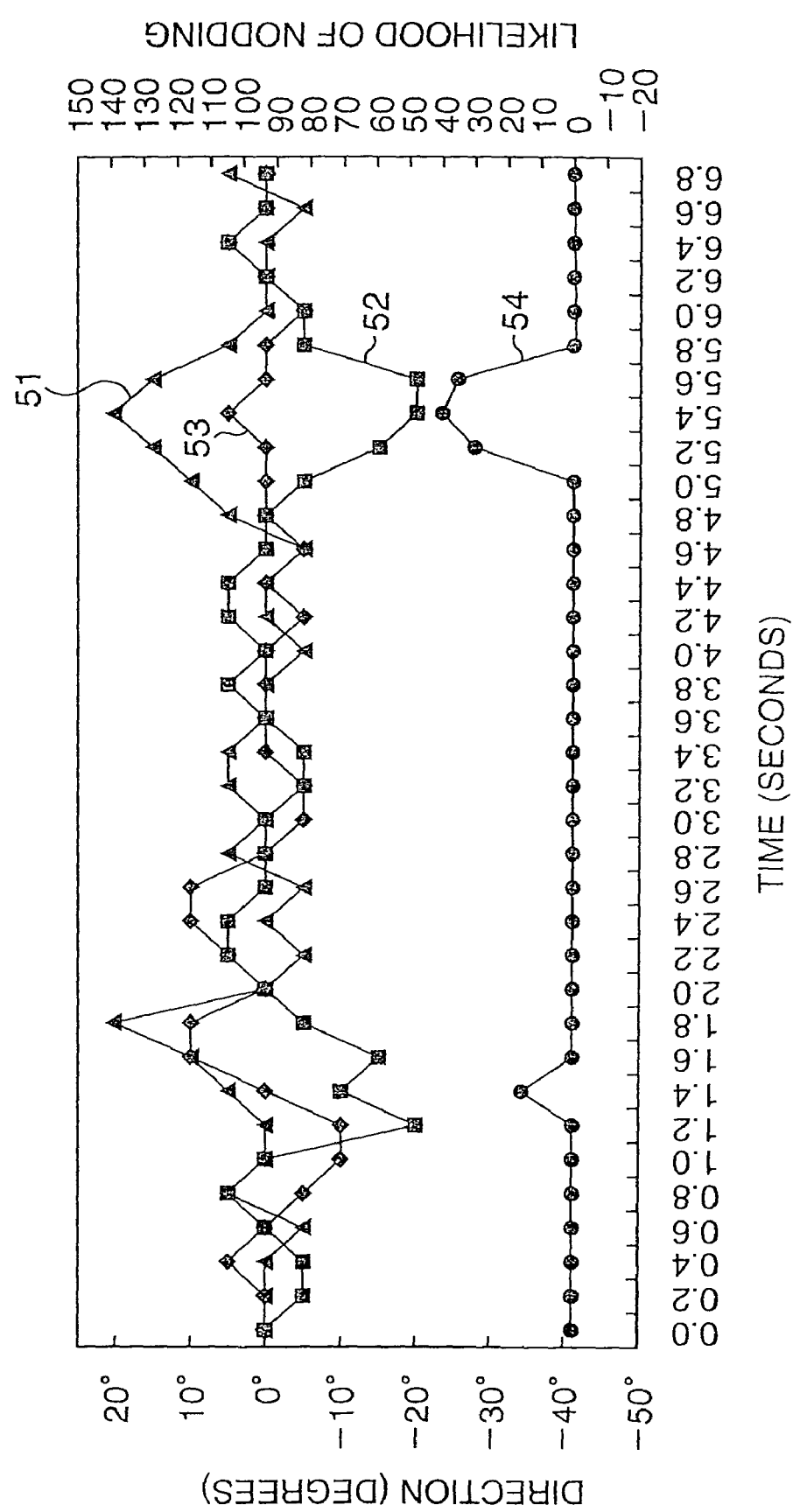
FIG. 9 is a graph illustrating an example in which a driver's nodding is recognized.

FIG. 9 is a graph showing changes in the directions of the driver's face and line of sight and in the likelihood of nodding are observed when the driver nods. In FIG. 9, the axis of abscissa indicates time, whereas the axis of ordinate indicates the directions of the face and line of sight and the likelihood of nodding. Line 51 indicates changes in vertical face direction. Line 52 indicates changes in vertical line-of-sight direction with respect to the face direction. Line 53 indicates changes in lateral face direction. Line 54 indicates changes in likelihood of nodding.

In the example shown in FIG. 9, the threshold used to determine whether or not the driver is nodding is 30. The figure shows that the likelihood of nodding is equal to or more than the threshold 5.2 to 5.6 seconds after the driver has been urged to indicate his or her intention. The nod recognizing section 21 thus recognizes that the driver is nodding.

Figure 10:
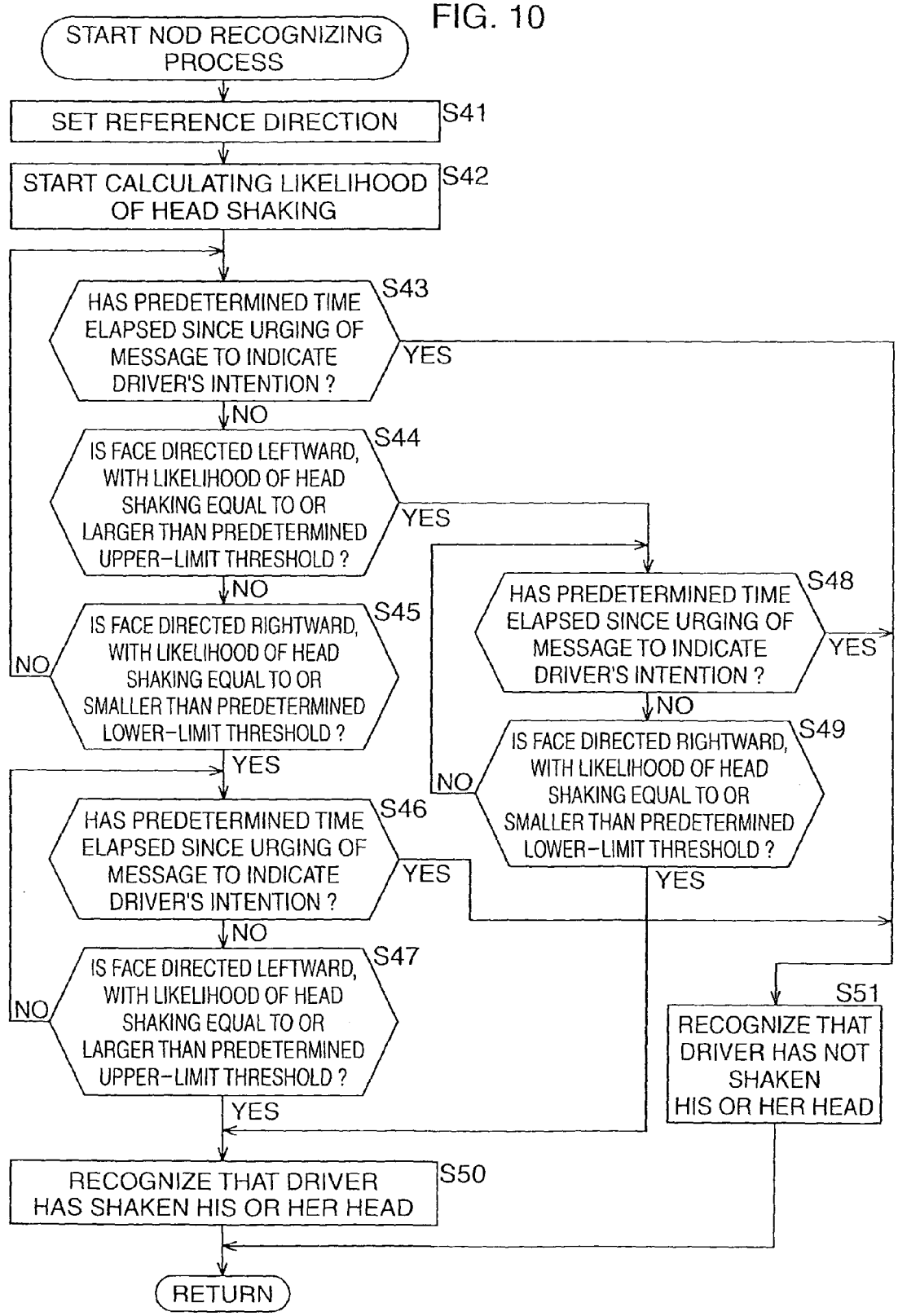
FIG. 10 is a flowchart illustrating a head shake recognizing process in step S5 in FIG. 2 in detail.

Now, with reference to the flowchart in FIG. 10, a detailed description will be given of the head shake recognizing process in step S5 in FIG. 2.

Figure 3:
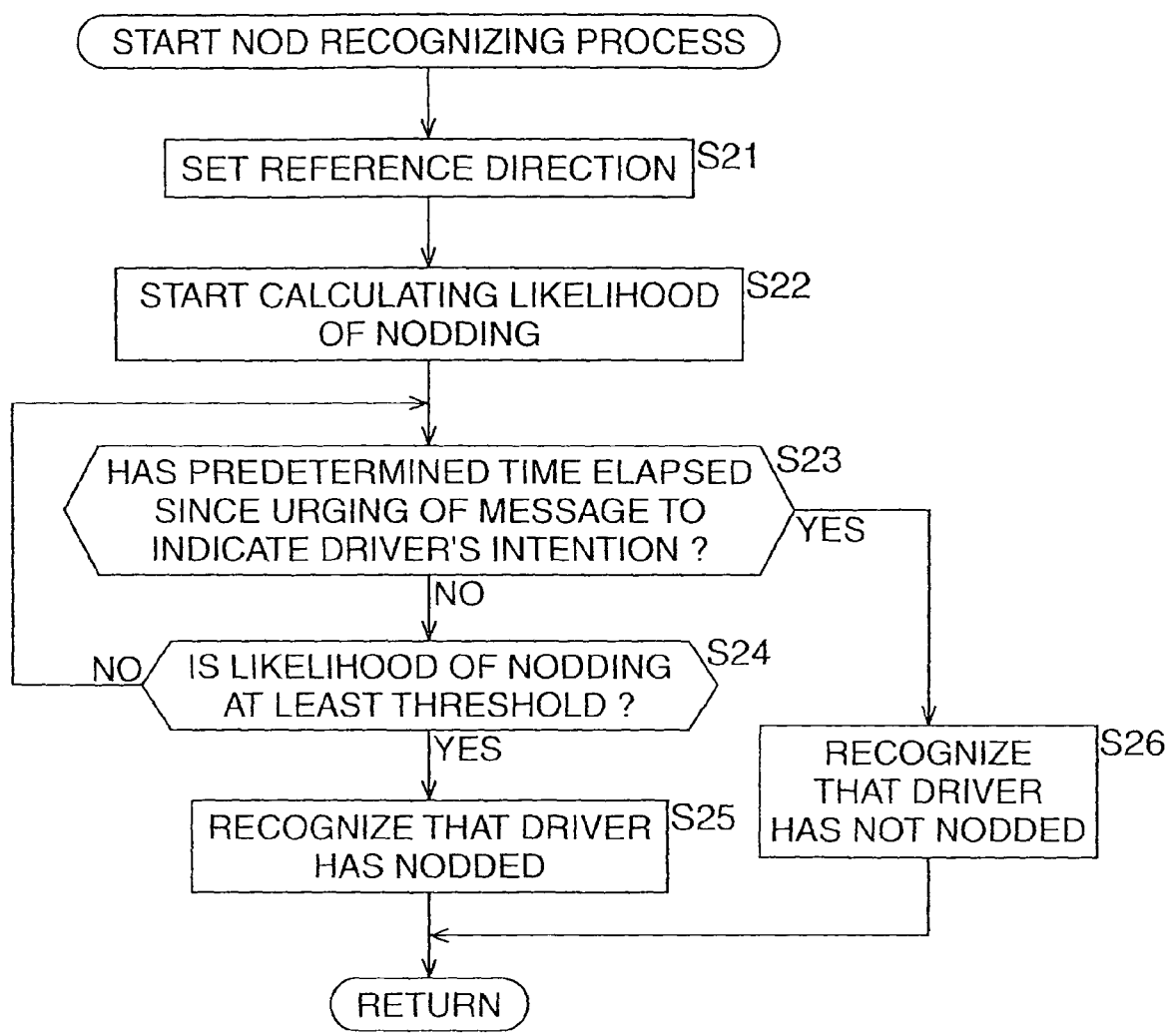
FIG. 3 is a flowchart illustrating a nod recognizing process in step S4 in FIG. 2 in detail.

In step S41, the head shake recognizing section 22 sets a reference direction as in the case of the processing executed by the nod recognizing section 21 in step S21 in FIG. 3, described above.

In step S42, the head shake recognizing section 22 starts calculating the likelihood of head shaking. Now, a method of calculating the likelihood of head shaking will be described with reference to FIGS. 11 to 14.

Figure 11:
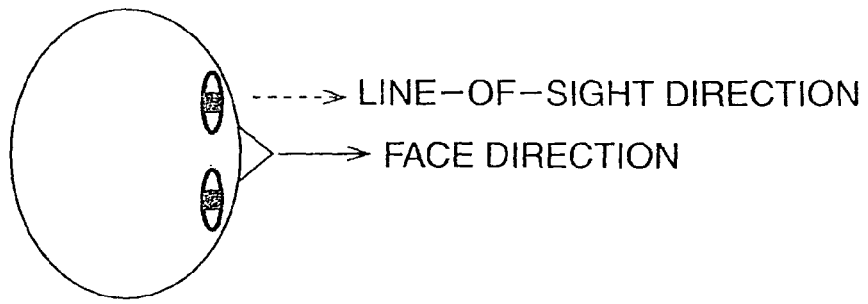
FIG. 11 is a diagram schematically showing the directions of face and line of sight of a person looking straight ahead.
Figure 12:
FIG. 12 is a diagram schematically showing the condition of eyes of the person shown in FIG. 11.
Figure 14:
FIG. 14 is a diagram schematically showing the condition of eyes of the person shown in FIG. 13.

FIG. 11 schematically shows the directions of face and line of sight of a person looking almost straight ahead as viewed from above his or her head. FIG. 12 schematically shows the condition of eyes of the person shown in FIG. 11. As shown in FIG. 11, if the person is looking almost straight ahead, for example, if the driver is looking forward while driving a car, the face direction almost coincides with the line-of-sight direction. In spite of the difference among individuals, the iris is located almost in the center of each eye as shown in FIG. 14.

Figure 13:
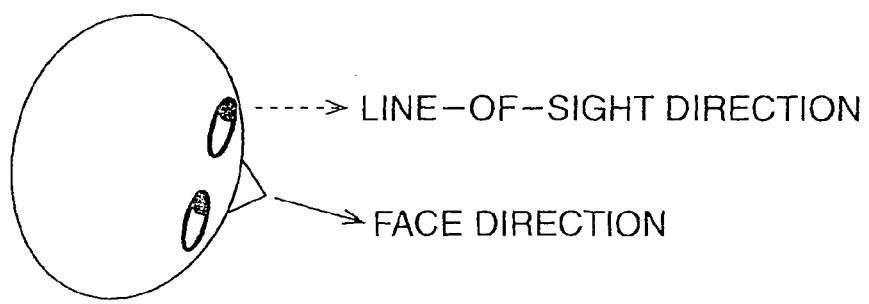
FIG. 13 is a diagram schematically showing the directions of face and line of sight of a person shaking his or her head.

FIG. 13 schematically shows the directions of face and line of sight of a person shaking his or her head to indicate his or her intention as viewed from above his or her head. FIG. 13 schematically shows the condition of eyes of the person shown in FIG. 14. When a person shakes his or her head to indicate his or her intention, he or she tends to change only the face direction while almost fixing his or her eyes. For example, while two persons are taking a conversation, each of them shakes his or her head while almost focusing his or her eyes on the other. While performing an operation such as driving, a person shakes his or her head while almost focusing his or her eyes on the target of the operation. Even if the person has no such a target to gaze, he or she need not look in the direction of the head shaking and thus shakes his or her head while almost fixing his or her eyes.

Accordingly, when a person shakes his or her head, the face direction deviates from the line-of-sight direction as shown in FIG. 13. That is, the face direction is opposite to the line-of-sight direction. Thus, in spite of the difference among individuals, the iris moves, in each eye, in the direction (in this case, leftward) opposite to that of movement of the face (in this case, rightward) as shown in FIG. 14. In other words, the person casts a side glance.

The head shake recognizing section 22 calculates the likelihood of head shaking by noting the difference between the movements (directions) of the face and the line of sight in the lateral direction observed when a person shakes his or her head. Specifically, the likelihood of head shaking is calculated in accordance with Equation (2) shown below if the driver's face is located at least a predetermined first angle (for example, 5°) rightward or leftward from a reference direction and if the driver's line of sight is located at least a predetermined second angle (for example, 5°) from the lateral face direction in the direction opposite to the face direction and if the upward or downward face direction is located at less than a predetermined third angle (for example, 5°) from a reference direction, that is, if the driver looks leftward or rightward and almost in the vertical reference direction, while casting a glance in the direction laterally opposite to the face direction.

Likelihood of head shaking=lateral line-of-sight direction with respect to the face direction−lateral face direction (2)

That is, the likelihood of head shaking is expressed by the sum of the angle between the face direction and the line-of-sight direction observed when the person casts an side glance and the angle between the face direction and the line-of-sight direction observed when the person's head is directed in lateral face direction (Equation (2) is a subtraction because of the signs of the angles).

On the other hand, if the face and line-of-sight directions are not in the above conditions, the likelihood of head shaking is zero.

The head shake recognizing section 22 starts calculating the likelihood of head shaking on the basis of the above method.

In step S43, the head shake recognizing section 22 determines whether or not a predetermined time has elapsed since the driver was urged to indicate his or her intention. If the head shake recognizing section 22 determines that the predetermined time (for example, 7 seconds) has not elapsed since the urging of the message to indicate the driver's intention in step S41, the process proceeds to step S44.

In step S44, the head shake recognizing section 22 determines whether or not the following two conditions are met: the face is directed leftward and the likelihood of head shaking is at least a predetermined upper-limit threshold. If the head shake recognizing section 22 determines that the face is directed rightward (the angle of the lateral face direction is larger than 0°) or the likelihood of head shaking is smaller than the predetermined upper-limit threshold (for example, 30), that is, if the driver is determined not to be shaking his or her head leftward, the process proceeds to step S45.

In step S45, the head shake recognizing section 22 determines whether or not the following two conditions are met: the face is directed rightward and the likelihood of head shaking is at most a predetermined lower-limit threshold. If the head shake recognizing section 22 determines that the face is directed leftward (the angle of the lateral face direction is smaller than 0°) or the likelihood of head shaking is larger than the predetermined lower-limit threshold (for example, −30), that is, if the driver is determined not to be shaking his or her head rightward, the process returns to step S43.

The processing in steps S43 to S45 is subsequently repeated until the head shake recognizing section 22 determines in step S43 that the predetermined time has elapsed since the driver was urged to indicate his or her intention, until the head shake recognizing section 22 determines in step S44 that the face is directed leftward and that the likelihood of head shaking is at least the predetermined upper-limit threshold, or until the head shake recognizing section 22 determines in step S45 that the face is directed rightward and that the likelihood of head shaking is at most the predetermined lower-limit threshold.

If the head shake recognizing section 22 determines in step S45 that the face is directed rightward and that the likelihood of head shaking is at most the predetermined lower-limit threshold, that is, if the head shake recognizing section 22 determines that the driver has shaken his or her head rightward, the process proceeds to step S46.

Figure 15:
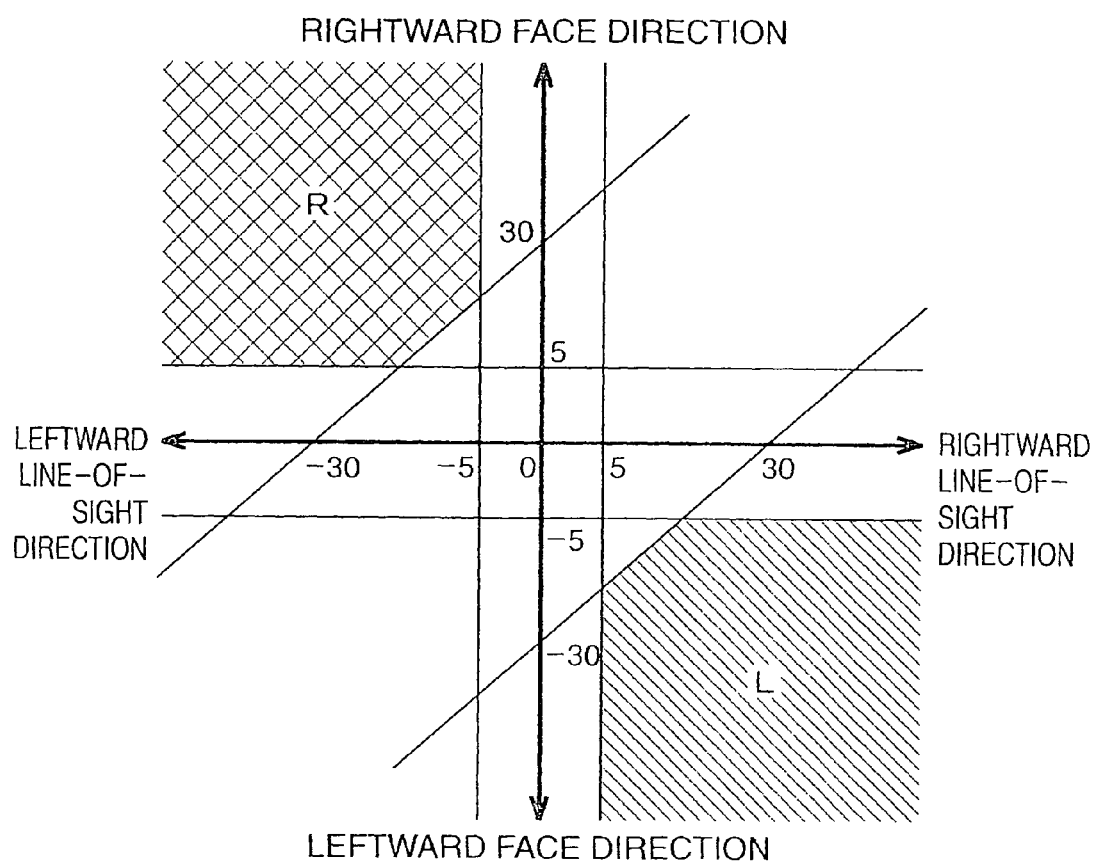
FIG. 15 is a graph showing the state in which the likelihood of head shaking is at least an upper-limit threshold or at most a lower-limit threshold.

FIG. 15 is a graph in which the axis of abscissa indicates the lateral line-of-sight direction with respect to the face direction, whereas the axis of ordinate indicates the lateral face direction with respect to the reference direction. The angle of the rightward line-of-sight direction increases as a point on the axis of abscissa moves rightward from the origin. The angle of the leftward line-of-sight direction increases as the point on the axis of abscissa moves leftward from the origin. The angle of the rightward face direction increases as a point on the axis of ordinate moves upward from the origin.

The angle of the leftward face direction increases as the point on the axis of ordinate moves downward from the origin.

In a meshed area R in FIG. 15, the likelihood of head shaking is at least the predetermined lower-limit threshold when the face is directed rightward (in the example shown in FIG. 15, −30). That is, in the area R, the driver's face is located at least the predetermined first angle (in the example shown in FIG. 15, 5°) rightward from the reference direction, the driver's line of sight is located at least the predetermined second angle (in the example shown in FIG. 15, 5°) leftward from the face direction, and the sum (likelihood of head shaking) of the angle between the rightward face direction and the reference direction and the angle between the leftward line-of-sight direction and the face direction is at least the predetermined threshold (in the example shown in FIG. 15, 30 (absolute value of the lower-limit threshold)).

In step S46, the head shake recognizing section 22 determines whether or not the predetermined time has elapsed since the driver was urged to indicate his or her intention, as in the case of the processing in step S43. If the head shake recognizing section 22 determines that the predetermined time has not elapsed since the urging of the message to indicate the driver's intention, the process proceeds to step S47.

In step S47, the head shake recognizing section 22 determines whether or not the following two conditions are met: the face is directed leftward and the likelihood of head shaking is at least the predetermined upper-limit threshold, as in the case of the processing in step S44. If the head shake recognizing section 22 determines that the face is directed rightward or that the likelihood of head shaking is smaller than the predetermined upper-limit threshold (for example, 30), that is, if the driver is determined not to be shaking his or her head leftward, the process returns to step S46. The processing in steps S46 and S47 is subsequently repeated until the head shake recognizing section 22 determines in step S46 that the predetermined time has elapsed since the driver was urged to indicate his or her intention or until the head shake recognizing section 22 determines in step S47 that the face is directed leftward and that the likelihood of head shaking is at least the predetermined upper-limit threshold.

If the head shake recognizing section 22 determines in step S47 that the face is directed leftward and that the likelihood of head shaking is at least the predetermined upper-limit threshold, that is, if the head shake recognizing section 22 determines that the driver has shaken his or her head leftward, the process proceeds to step S50. This refers to the case where the head shake recognizing section 22 determines, also on the basis of the determination in step S45, that the driver has shaken his or her head both rightward and leftward within the predetermined time after the urging of the message to indicate his or her intention.

In a shaded area L in FIG. 15, the likelihood of head shaking is at least the predetermined upper-limit threshold when the face is directed leftward (in the example shown in FIG. 15, 30). That is, in the area L, the driver's face is located at least the predetermined first angle (in the example shown in FIG. 15, 5°) leftward from the reference direction, the driver's line of sight is located at least the predetermined second angle (in the example shown in FIG. 15, 5°) rightward from the face direction, and the sum (likelihood of head shaking) of the angle between the leftward face direction and the reference direction and the angle between the rightward line-of-sight direction and the face direction is at least the predetermined threshold (in the example shown in FIG. 15, 30).

If the head shake recognizing section 22 determines in step S44 that the face is directed leftward and that the likelihood of head shaking is at least the predetermined upper-limit threshold, that is, if the driver is determined to have shaken his or her head leftward, the process proceeds to step S48.

In step S48, the head shake recognizing section 22 determines whether or not the predetermined time has elapsed since the driver was urged to indicate his or her intention, as in the case of the processing in step S43. If the head shake recognizing section 22 determines that the predetermined time has not elapsed since the urging of the message to indicate the driver's intention, the process proceeds to step S49.

In step S49, the head shake recognizing section 22 determines whether or not the following two conditions are met: the face is directed rightward and the likelihood of head shaking is at most the predetermined lower-limit threshold, as in the case of the processing in step S45. If the head shake recognizing section 22 determines that the face is directed leftward or that the likelihood of head shaking is larger than the predetermined lower-limit threshold, that is, if the driver is determined not to be shaking his or her head rightward, the process returns to step S48.

The processing in steps S48 and S49 is subsequently repeated until the head shake recognizing section 22 determines in step S48 that the predetermined time has elapsed since the driver was urged to indicate his or her intention or until the head shake recognizing section 22 determines in step S49 that the face is directed rightward and that the likelihood of head shaking is at most the predetermined lower-limit threshold.

If the head shake recognizing section 22 determines in step S48 that the face is directed rightward and that the likelihood of head shaking is at most the predetermined lower-limit threshold, that is, if the head shake recognizing section 22 determines that the driver has shaken his or her head rightward, the process proceeds to step S50. This refers to the case where the head shake recognizing section 22 determines, also on the basis of the determination in step S44, that the driver has shaken his or her head both rightward and leftward within the predetermined time after the urging of the message to indicate his or her intention.

In step S50, the head shake recognizing section 22 recognizes that the driver has shaken his or her head, to finish the head shake recognizing process. The head shake recognizing section 22 then supplies information indicative of the recognition result to the intention recognizing section 17. If the head shake recognizing section 22 determines in step S43, S46, or S48 that the predetermined time has elapsed since the urging of the message to indicate the driver's intention, that is, if the head shake recognizing section 22 determines that the head has not been shaken at least either rightward or leftward, the process proceeds to step S51.

In step S51, the head shake recognizing section 22 recognizes that the driver has not shaken his or her head, to finish the head shake recognizing process. The head shake recognizing section 22 then supplies information indicative of the recognition to the intention recognizing section 17.

Figure 16:
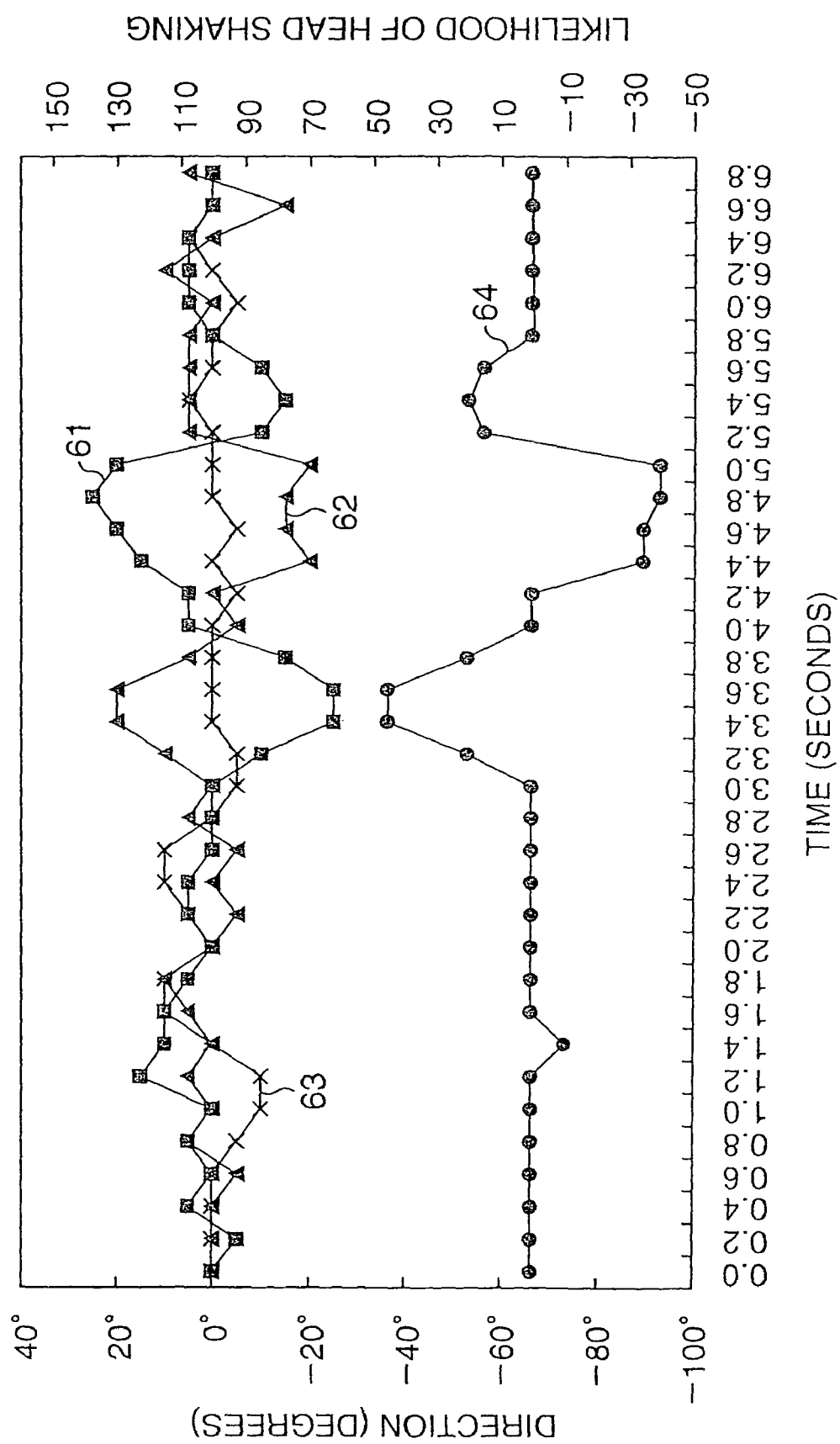
FIG. 16 is a graph illustrating an example in which the driver's head shaking is recognized.

FIG. 16 is a graph showing changes in the directions of the face and line of sight and in the likelihood of head shaking which changes occur when the driver shakes his or her head. In FIG. 16, the axis of abscissa indicates time, while the axis of ordinate indicates the directions the face and line of sight and the likelihood of head shaking. Line 61 indicates changes in the lateral face direction. Line 62 indicates changes in the lateral line-of-sight direction with respect to the face direction. Line 63 indicates changes in the vertical face direction. Line 64 indicates changes in the likelihood of head shaking.

In the example shown in FIG. 16, the upper-limit threshold used to determine whether or not the driver is shaking his or her head leftward is set at 30. The lower-limit threshold used to determine whether or not the driver is shaking his or her head rightward is set at −30. Then, the likelihood of head shaking is equal to or larger than the upper-limit threshold 3.4 to 3.6 seconds after the urging of the message to indicate the driver's intention. The head shake recognizing section 22 thus recognizes that the driver has shaken his or her head leftward. The likelihood of head shaking is equal to or smaller than the lower-limit threshold 4.4 to 5.0 seconds after the urging of the message to indicate the driver's intention. The head shake recognizing section 22 thus recognizes that the driver has shaken his or her head rightward.

As described above, the present embodiment enables the user's (driver's) movement indicating his or her intention to be recognized easily and accurately. This makes it possible to recognize the user's intention easily and reliably. The embodiment only requires the user to make a very natural movement such as nodding or head shaking. This prevents a heavy burden from being imposed on the user. Further, the user need not cast a glance or turn his or her face in a predetermined direction or move his or her hand or foot. The user can thus indicate his or her intention to the intention checking apparatus 1 while continuously performing an operation such as driving.

Now, description will be given of another method of recognizing nodding and head shaking.

Figure 17:
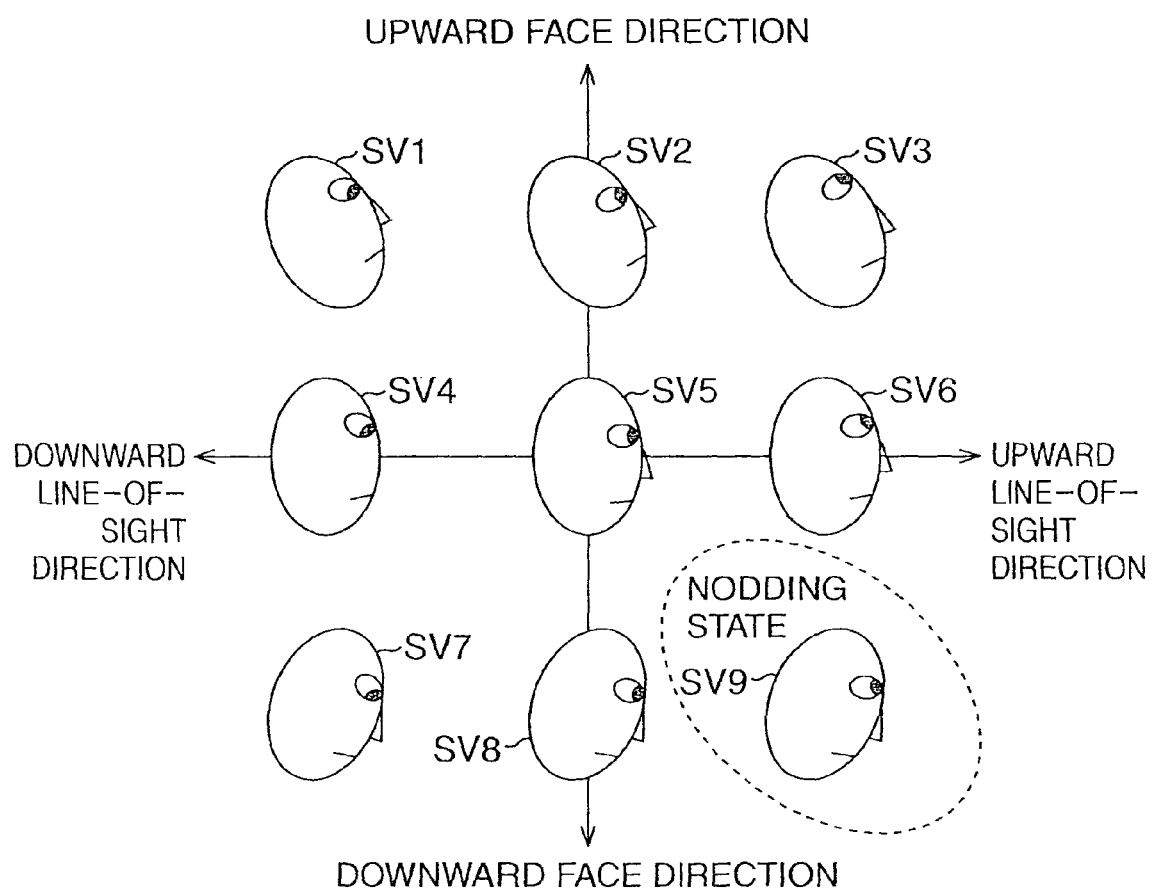
FIG. 17 is a diagram illustrating another method of recognizing the driver's nodding.

As shown in FIG. 17, the following nine states are present which are based on the combination of the vertical face direction and the line-of-sight direction with respect to the face direction: a state SV1 in which the face is directed upward, while the line of sight is directed downward with respect to the face direction, a state SV2 in which the face is directed upward, with the face direction almost the same as the line-of-sight direction, a state SV3 in which the face is directed upward, with the line of sight directed upward with respect to the face direction, a state SV4 in which the face is directed almost in the horizontal direction, while the line of sight is directed downward with respect to the face direction, a state SV5 in which the face is directed almost in the horizontal direction, with the face direction almost the same as the line-of-sight direction, a state SV6 in which the face is directed almost in the horizontal direction, while the line of sight is directed upward with respect to the face direction, a state SV7 in which the face is directed downward, with the line of sight directed downward with respect to the face direction, a state SV8 in which the face is directed downward, with the face direction almost the same as the line-of-sight direction, and a state SV9 in which the face is directed downward, while the line of sight is directed upward with respect to the face direction.

As described above, when a person nods, the tendency of his or her movement is to turn his or her face downward, while turning his or her line of sight upward with respect to the face direction. Consequently, a possible method recognizes the person's nodding upon detecting that he or she is in the state SV9. This method is less accurate than that described with reference to FIG. 3 and others but enables the person's nodding to be more quickly recognized.

Figure 18:
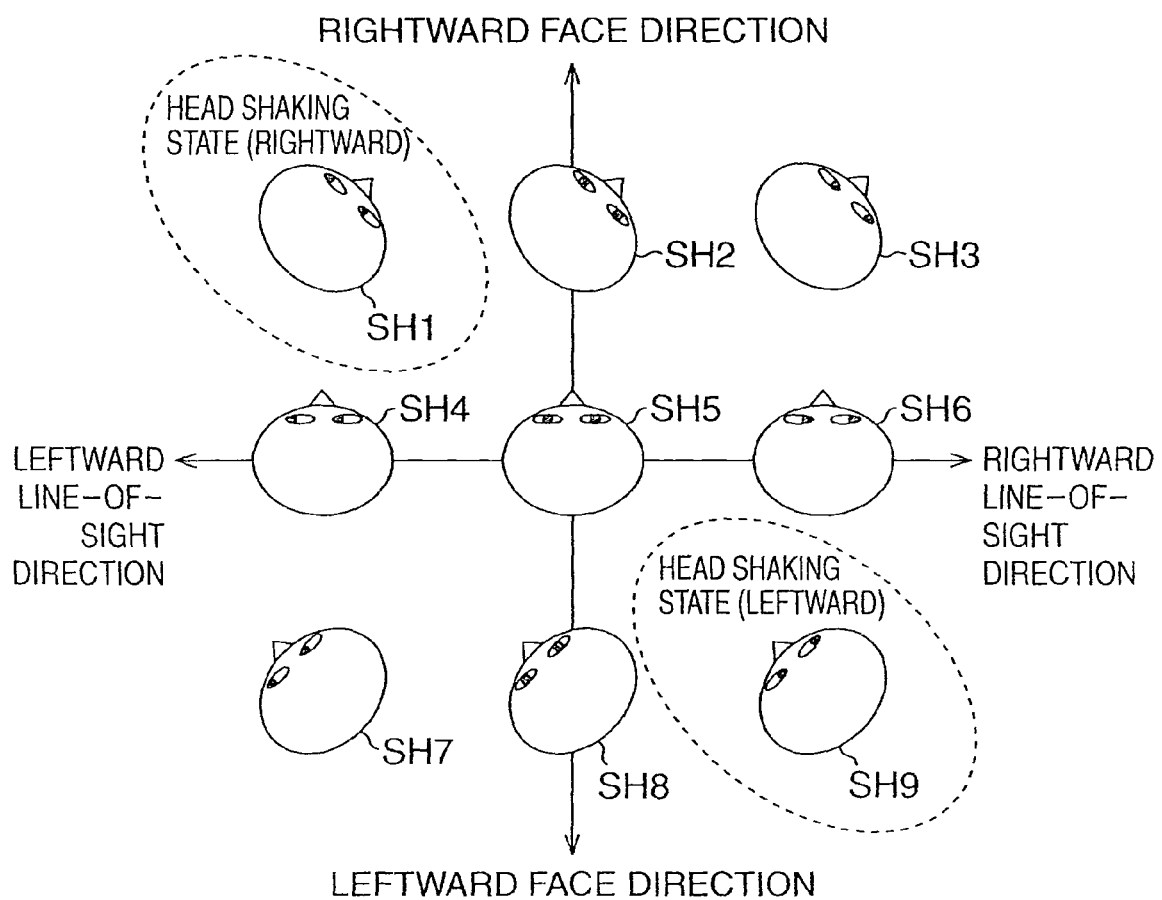
FIG. 18 is a diagram illustrating another method of recognizing the driver's head shaking.

Similarly, as shown in FIG. 18, the following nine states are present which are based on the combination of the lateral face direction and the line-of-sight direction with respect to the face direction: a state SH1 in which the face is directed rightward, while the line of sight is directed leftward with respect to the face direction, a state SH2 in which the face is directed rightward, with the face direction almost the same as the line-of-sight direction, a state SH3 in which the face is directed rightward, with the line of sight directed rightward with respect to the face direction, a state SH4 in which the face is directed almost straight ahead, while the line of sight is directed leftward with respect to the face direction, a state SH5 in which the face is directed almost straight ahead, with the face direction almost the same as the line-of-sight direction, a state SH6 in which the face is directed almost straight ahead, while the line of sight is directed rightward with respect to the face direction, a state SH7 in which the face is directed leftward, with the line of sight directed leftward with respect to the face direction, a state SH8 in which the face is directed leftward, with the face direction almost the same as the line-of-sight direction, and a state SH9 in which the face is directed leftward, while the line of sight is directed rightward with respect to the face direction.

As described above, when a person shakes his or her head, the tendency of his or her movement is to turn his or her face leftward or rightward, while turning his or her line of sight in the direction opposite to the face direction. Consequently, a possible method recognizes that the person is shaking his or her head rightward, upon detecting that he or she is in the state SH1 and recognizes the person is shaking his or her head leftward, upon detecting that he or she is in the state SH9. This method is less accurate than that described with reference to FIG. 10 and others but enables the person's shaking head to be more quickly recognized.

Another possible method uses Equations (3) and (4) shown below instead of the above calculation method and recognizes the person's nodding when the likelihood of nodding is at least a predetermined threshold and when the rightward or leftward face direction is located at less than a predetermined angle (for example, 5°) from the reference direction.

Likelihood of nodding=vertical line-of-sight direction with respect to the face direction×(−1×vertical face direction) (vertical face direction<0)   (3)

Likelihood of nodding=0 (vertical face direction≧0)   (4)

Figure 19:
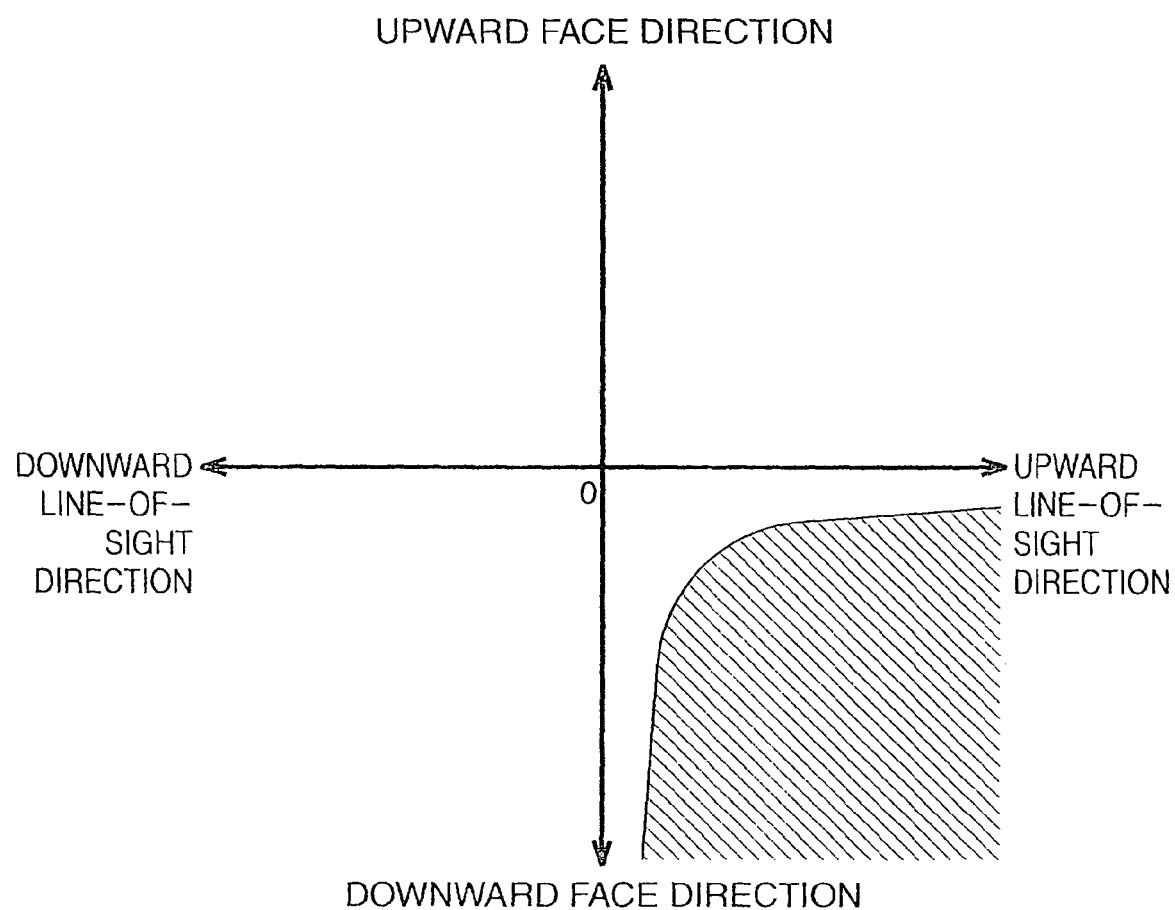
FIG. 19 is a diagram illustrating yet another method of recognizing the driver's nodding.

In this case, in a graph in FIG. 19 which has the same coordinate axes as those of the graph shown in FIG. 8, the likelihood of nodding is at least the predetermined threshold in a shaded area bounded by a curve.

Similarly, another possible method uses Equation (5) shown below instead of the above calculation method and recognizes the person's head shaking when the likelihood of head shaking is at most a predetermined threshold and when the upward or downward face direction is located at less than a predetermined angle (for example, 5°) from the reference direction.

Likelihood of head shaking=lateral line-of-sight direction with respect to the face direction×(lateral face direction)   (5)

Figure 20:
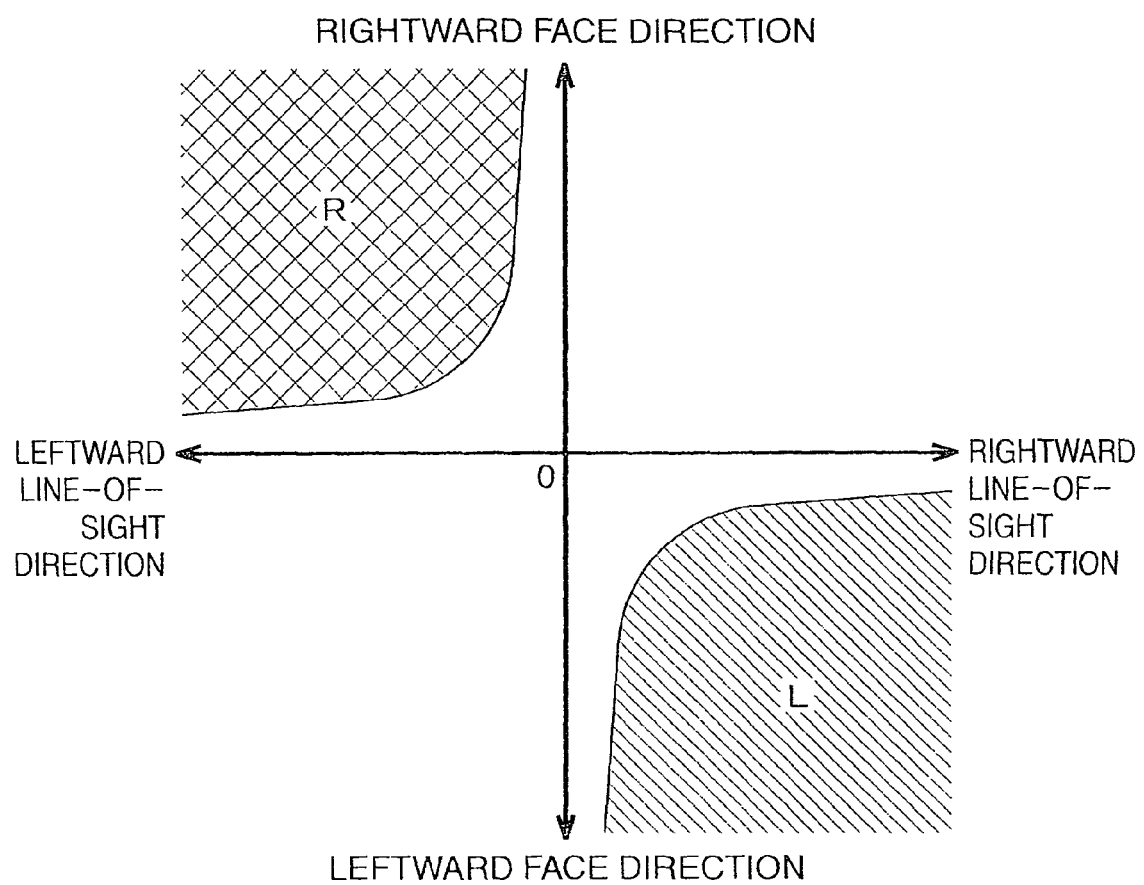
FIG. 20 is a diagram illustrating yet another method of recognizing the driver's head shaking.

In this case, in a graph in FIG. 20 which has the same coordinate axes as those of the graph shown in FIG. 15, the likelihood of had shaking is at most the predetermined threshold in a meshed area R and a shaded area L which are bounded by a hyperbola. The area R corresponds to rightward head shaking, whereas the area L corresponds to leftward head shaking.

As shown in FIG. 21, the graph having the same coordinate axes as those of the graph shown in FIG. 8 is divided into a plurality of areas. A value for the likelihood of nodding is assigned to each of the resulting areas. Then, a possible method recognizes the driver's nodding if the likelihood of nodding corresponding to the area to which the combination of the sensed vertical face direction and the vertical line-of-sight direction with respect to the face direction belongs is at least a predetermined threshold and if the rightward or leftward face direction is located at less than a predetermined angle (for example, 5°) from the reference direction.

Similarly, as shown in FIG. 22, the graph having the same coordinate axes as those of the graph shown in FIG. 15 is divided into a plurality of areas. A value for the likelihood of head shaking is assigned to each of the resulting areas. Then, a possible method recognizes the driver's head shaking if the likelihood of head shaking corresponding to the area to which the combination of the sensed lateral face direction and the lateral line-of-sight direction with respect to the face direction belongs is at least a predetermined threshold and if the upward or downward face direction is located at less than a predetermined angle (for example, 5°) from the reference direction.

In the description of the above example, if a state determined to be the driver's nodding (hereinafter referred to as a nodding state) is sensed, the nod recognizing section recognizes that the person has nodded. However, the nod recognizing section may recognize the driver's nodding if a change from a state determined not to be the driver's nodding (here in after referred to as a non-nodding state) to the nodding state has been sensed or if a change from the nodding state to the non-nodding state is sensed. Alternatively, the nod recognizing section may recognize the driver's nodding if a change from the nodding state to the non-nodding state has been sensed at least a predetermined first number of times within a predetermined time and if a change from the non-nodding state to the nodding state have been sensed at least a predetermined second number of times within the predetermined time, that is, if the repetition of the person's nodding motion is sensed.

In the description of the above example, the head shake recognizing section recognizes the driver's head shaking if the driver has shaken his or her head once both rightward and leftward. However, the head shake recognizing section may recognize the driver's head shaking if any of the following changes is sensed: a change from a state determined to be neither the driver's rightward nor leftward head shaking (hereinafter referred to as anon-head-shaking state) to a state determined to be the driver's right ward head shaking (hereinafter referred to as a rightward head shaking state) or to a state determined to be the driver's leftward head shaking (hereinafter referred to as a leftward head shaking state), or a change from the rightward or leftward head shaking state to the non-head-shaking state. Alternatively, the head shake recognizing section may recognize the driver's head shaking if a change from the non-head-shaking state to the rightward head shaking state has been sensed at least a predetermined first number of times within a predetermined time and if a change from the non-head-shaking state to the leftward head shaking state has been sensed at least a predetermined second number of times within the predetermined time, that is, if the repetition of the person's head shaking motion has been sensed.

As described above, the first communication device sets the first expression method and the second expression method associated with the first expression method, then transmits data indicative of the second expression method to the second communication device with which the first communication; the first communication device then expresses the establishment of the communication between the first communication device and the second communication device using the first expression method while the second expression method is used by the second communication device, the second communication device receives data sent by the first communication device and indicating the second expression method; when the establishment of the communication between the first communication device and the second communication device is expressed using the second expression method while the first expression method is used by the first communication device, this enables the communication devices to determine the establishment of the communication between them. Further, each of the communication devices can easily identity the other, thus making easy, reliable, and secure communications.

In the description of the above example, the voice message is output to urge the user to indicate his or her intention. However, the same effect can be produced by, for example, making a beep sound, displaying characters or symbols on a display device, or flashing a lamp.

Besides the above on-vehicle apparatus, the present invention is applicable to various apparatuses that check the user's intention, for example, personal computers, cellular phones, PDAs (Personal Digital Assistants), AV (Audio Visual) instruments, various electric appliances, and vending machines.

The above series of processes can be executed by hardware or software. If the series of processes are executed by software, programs in program recording media which constitute the software are installed in a computer incorporated into dedicated hard ware or, for example, a general purpose computer that can execute various functions in accordance with various installed programs.

Figure 23:
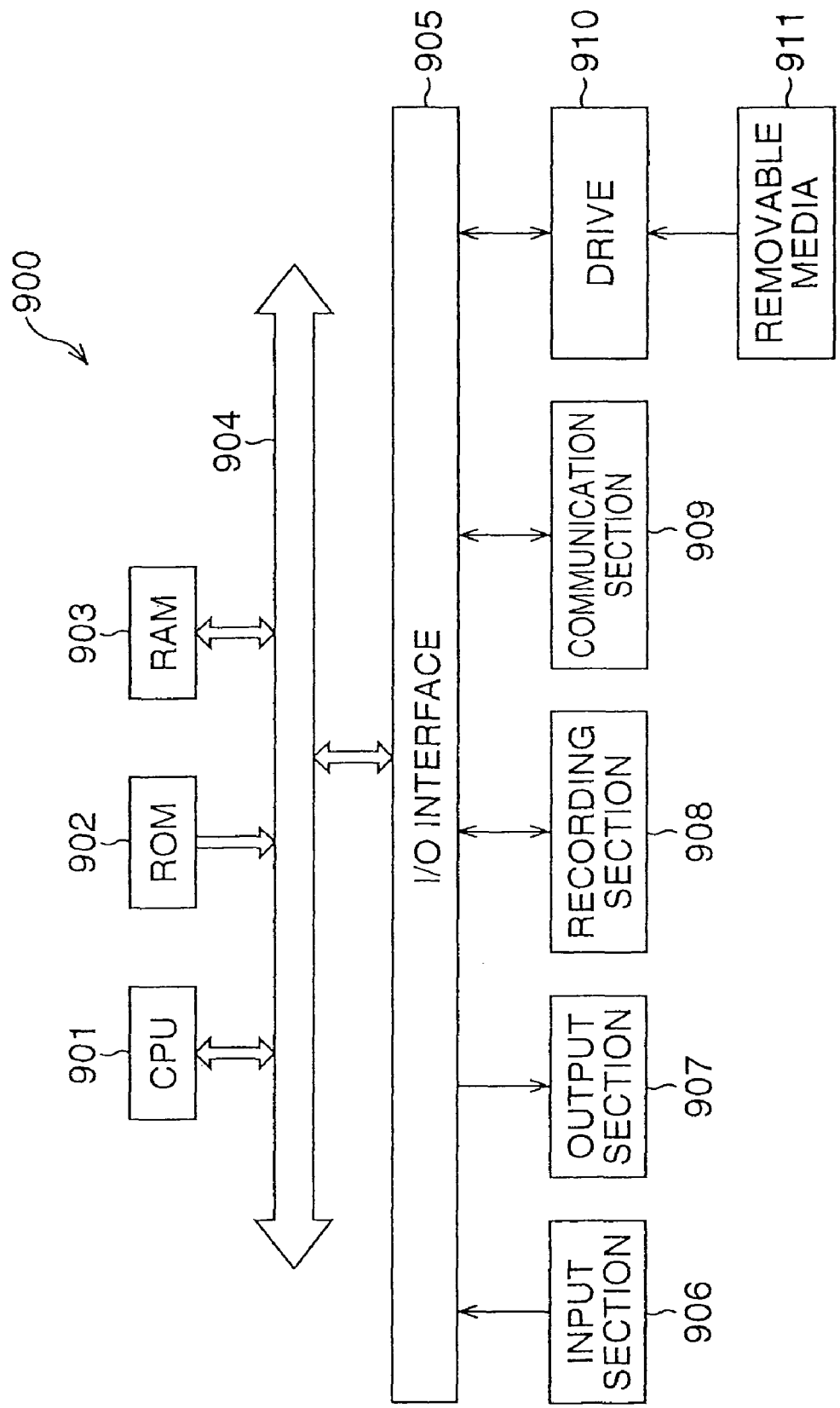
FIG. 23 is a block diagram showing an example of configuration of a personal computer.

FIG. 23 is a block diagram showing an example of configuration of a personal computer that executes the above series of programs in accordance with programs. A CPU (Central Processing Unit) 901 executes various processes in accordance with programs stored in a ROM (Read Only Memory) 902 or a recording section 908. A RAM (Random Access Memory) 903 appropriately stores programs executed by the CPU 901 and data.

The CPU 901, ROM 902, and RAM 903 are connected together via a bus 904.

An I/O interface 905 is also connected to the CPU 901 via the bus 904. The I/O interface 905 connects to an input section 906 consisting of a keyboard, a mouse, a microphone, or the like and an output section 907 consisting of a display, a speaker, or the like. The CPU 901 executes various processes corresponding to instructions input via the input section 906. The CPU 901 then outputs process results to the output section 907.

The recording section 908, connected to the I/O interface 905, consists of, for example, a hard disk to store programs executed by the CPU 901 and various data. The communication section 909 communicates with an external apparatus via a network such as the Internet or a local area network.

Programs may be acquired via the communication section 909 and stored in the recording section 908.

When removable media 911 such as a magnetic disk, optical disk, magneto optic disk, or semiconductor memory is installed in a drive 910 connected to the I/O interface 905, the drive 910 drives the removal media 911 to acquire a program or data recorded in it. The program or data acquired is transferred to and stored in the recording section 908 as required.

The recording media installed in a computer to store programs executable by a computer may be composed of the removal media 911 that is package media consisting of a magnetic disk (including flexible disk), an optical disk (including CD-ROM (Compact Disc-Read Only Memory) or DVD (Digital Versatile Disc)), a magneto optic disk, or a semiconductor memory, or a ROM 902 in which programs are temporarily or permanently stored, or a hard disk constituting the recording section 908, as shown in FIG. 23. Programs are stored in the program recording media via the communication section 909 that is an interface such as a router or a modem, utilizing wired or wireless communication media such as a local area network, the Internet, or digital satellite broadcasting.

In the present specification, the steps describing the programs stored in the program recording media include not only processes executed in the descried order in accordance with time series but also those which are not necessarily executed in accordance with the time series but which are executed in parallel or individually.

The embodiments of the present invention are not limited to those described above but may be variously changed without departing from the spirit of the present invention.

What is claimed is:

1. A recognizing apparatus comprising:
    face direction sensing means for sensing a direction of a user's face;
    line-of-sight direction sensing means for sensing a direction of the user's line of sight; and
    movement recognizing means for recognizing that the user has nodded to indicate the user's intention if the user is in a state in which the direction of the user's face sensed by the face direction sensing means is directed downward while the direction of the user's line of sight sensed by the line-of-sight direction sensing means is directed upward with respect to the direction of the face sensed by the face direction sensing means.

2. The recognizing apparatus according to claim 1, wherein the state is a first state, and
    the movement recognizing means recognizes that the user has nodded to indicate the user's intention if, within a predetermined time after the user is urged to indicate the user's intention, the user makes a first change in which the user moves from a second state to the first state or a second change in which the user moves from the first state to the second state.

3. The recognizing apparatus according to claim 2, wherein the movement recognizing means recognizes that the user has nodded to indicate the user's intention if, within the predetermined time, the user makes the first change at least a predetermined first number of times and makes the second change at least a predetermined second number of times.

4. The recognizing apparatus according to claim 1, wherein the movement recognizing means recognizes that the user has nodded to indicate the user's intention if the user is in a first state in which, within the predetermined time, the face is tilted downward at least a predetermined first angle from a predetermined direction, the line of sight is tilted upward at least a predetermined second angle with respect to the direction of the face, a sum of an angle of the face tilted downward from the predetermined direction and an angle of the line of sight tilted upward with respect to the direction of the face becomes at least a predetermined threshold, and a leftward or rightward direction of the face is less than a predetermined third angle from the predetermined direction.

5. The recognizing apparatus according to claim 1, wherein the movement recognizing means recognizes that the user has shaken the user's head to indicate the user's intention if the user is in a first state in which the user's face is directed rightward while the user's line of sight is directed leftward with respect to the direction of the face or if the user is in a second state in which the user's face is directed leftward while the user's line of sight is directed rightward with respect to the direction of the face.

6. The recognizing apparatus according to claim 5, wherein the movement recognizing means recognizes that the user has shaken the user's head to indicate the user's intention if, within a predetermined time after the user is urged to indicate the user's intention, the user makes a first change in which the user moves from a third state to the first state, a second change in which the user moves from the third state to the second state, a third change in which the user moves from the first state to the third state, or a fourth change in which the user moves from the second state to the third state.

7. The recognizing apparatus according to claim 6, wherein the movement recognizing means recognizes that the user has shaken the user's head to indicate the user's intention if, within the predetermined time, the user makes the first change at least a predetermined first number of times and makes the second change at least a predetermined second number of times.

8. The recognizing apparatus according to claim 5, wherein the movement recognizing means recognizes that the user has shaken the user's head to indicate the user's intention if:
the user is in a third state in which, within the predetermined time, the face is turned rightward at least a predetermined first angle from a predetermined direction, the line of sight is turned leftward to at least a predetermined second angle with respect to the direction of the face, a sum of an angle of the face turned rightward from the predetermined direction and an angle of the line of sight turned leftward with respect to the direction of the face becomes at least a predetermined threshold, and an upward or downward direction of the face is less than a predetermined third angle from the predetermined direction, or
the user is in a fourth state in which, within the predetermined time, the face is turned leftward to at least the first angle from the predetermined direction, the line of sight is turned rightward to at least the second angle with respect to the direction of the face, a sum of an angle of the face turned leftward from the predetermined direction and an angle of the line of sight turned rightward with respect to the direction of the face becomes at least the predetermined threshold, and the upward or downward direction of the face is less than the predetermined third angle from the predetermined direction.

9. The recognizing apparatus according to claim 1, further comprising intention recognizing means for recognizing the user's intention on the basis of the user's movement indicating the user's intention recognized by the movement recognizing means.

10. A recognizing method comprising:
sensing a direction of a user's face;
sensing a direction of the user's line of sight; and
recognizing that the user has nodded to indicate the user's intention if the user is in a state in which the direction of the sensed user's face is directed downward while the direction of the sensed user's line of sight is directed upward with respect to the direction of the sensed user's face.

11. A non-transitory computer-readable medium comprising a program for allowing a computer to execute a process comprising:
sensing a direction of a user's face;
sensing a direction of the user's line of sight; and
recognizing that the user has nodded to indicate the user's intention if the user is in a state in which the direction of the sensed user's face is directed downward while the direction of the sensed user's line of sight is directed upward with respect to the direction of the sensed user's face.

12. A recognizing apparatus comprising:
face direction sensing section configured to sense a direction of a user's face;
line-of-sight direction sensing section configured to sense a direction of the user's line of sight; and
movement recognizing section configured to recognize that the user has nodded to indicate the user's intention if the user is in a state in which the direction of the user's face sensed by the face direction sensing section is directed downward while the direction of the user's line of sight sensed by the line-of-sight direction sensing section is directed upward with respect to the direction of the face sensed by the face direction sensing section.

\* \* \* \* \*